United States Patent [19] [11] Patent Number: 4,962,535
Kimura et al. [45] Date of Patent: Oct. 9, 1990

[54] VOICE RECOGNITION SYSTEM

[75] Inventors: Shinta Kimura; Toru Sanada, both of Kawasaki, Japan

[73] Assignee: Fujitsu Limited, Kawasaki, Japan

[21] Appl. No.: 464,594

[22] Filed: Jan. 12, 1990

Related U.S. Application Data

[63] Continuation of Ser. No. 165,842, Mar. 9, 1988, abandoned.

[30] Foreign Application Priority Data

Mar. 10, 1987 [JP] Japan ................................. 62-053066

[51] Int. Cl.⁵ ............................................... G10L 5/00
[52] U.S. Cl. ...................................................... 381/43
[58] Field of Search ........................................... 381/43

[56] References Cited

U.S. PATENT DOCUMENTS

| 4,435,617 | 3/1984 | Griggs | 381/43 |
| 4,516,215 | 5/1985 | Hakaridani | 381/43 |
| 4,624,010 | 11/1986 | Takebayashi | 381/43 |
| 4,715,004 | 12/1987 | Kabasawa | 381/43 |
| 4,748,670 | 5/1988 | Bahl et al. | 381/43 |

OTHER PUBLICATIONS

Systems Computers Controls, vol. 9, No. 3, May–Jun. 1978, "A Real-time Spoken Word Recognition System with Various Learning Capabilities of Speaker Differences", S. Nakagawa et al., pp. 395–402.

Primary Examiner—Emanuel S. Kemeny
Attorney, Agent, or Firm—Staas & Halsey

[57] ABSTRACT

A voice recognition system for selecting word templates necessary for voice recognition from among a plurality of word templates. The system includes an input phoneme extraction unit for extracting distinctive phonemes which can be clearly recognized from an input pattern of the voice, and all phonemes possibly existing in the input pattern, and a dictionary phoneme extraction unit for extracting the distinctive phonemes which can be clearly recognized and can be previously determined at each word template, and all phonemes possibly existing at each word template. A pre-selector selects valid word templates for performing voice recognition based on phoneme information extracted by the input phoneme extraction unit and the dictionary phoneme extraction unit.

3 Claims, 17 Drawing Sheets

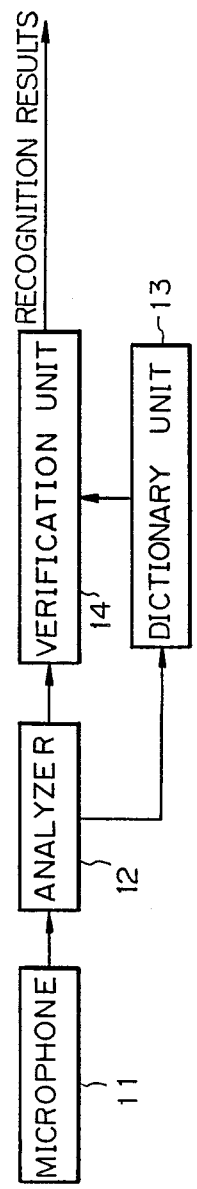
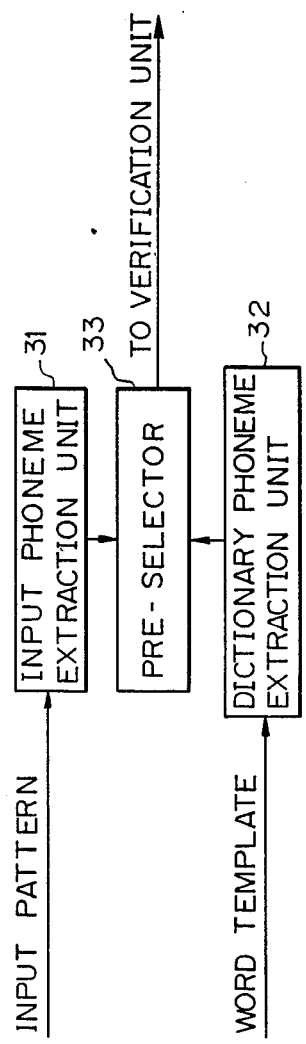

Fig. 5

BIT POSITION

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| A | I | U | E | O | K | S | SH | T | CH | TS | N | H | M | Y | R |

| 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|
| W | N" | G | Z | D | B | P | Q | X | X | X | X | X | X | X | X |

Fig. 6

BIT POSITION

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 0 | 0 | 0 | 1 | 0 | 1 | 0 | 0 | 0 | 0  | 0  | 0  | 0  | 0  | 0  |

| 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|
| 0  | 0  | 0  | 0  | 0  | 0  | 0  | 0  | 0  | 0  | 0  | 0  | 0  | 0  | 0  | 0  |

Fig. 14

| (NN) | 0 NODE | 1 NODE | 2 NODE | 3 NODE | 4 NODE | 5 NODE | DUMMY NODE |
|---|---|---|---|---|---|---|---|
| ADDRESS | 0 | 1 | 2 | 3 | 4 | 5 | 6 |
| CONTENT | 7 | 1 | 5 | 2 | 7 | 1 | -1 |
| (PHONEME LABEL) | (SH) | I | K | A | SH | I | # ) |
| DEPTH(MM)=16 ↓ | -1 | 0 | 1 | 2 | 3 | 4 | 5 |
| | 8 | 8 | 0 8 | 8 | 8 | 8 | 4 ⎤ |
| | 8 | 8 | 8 | 8 | 8 | 8 | 8 ⎥ CONTENT OF |
| | ⋮ | ⋮ | ⋮ | ⋮ | ⋮ | ⋮ | ⋮ ⎬ CONNECTION |
| | 8 | 8 | 8 | 8 | 8 | 8 | 8 ⎦ TABLE MEMORY |

VOICE RECOGNITION SYSTEM

This is a continuation of copending application Ser. No. 07/165,842 filed on Mar. 9, 1988, now abandoned.

BACKGROUND OF THE INVENTION

1. Field of the Invention

The present invention relates to a voice recognition system. More particularly, the present invention is directed to a pre-selector provided in a voice recognition system for selecting valid word templates to be used as references from among a plurality of such word templates. The present invention is advantageous for recognizing a word from among a large vocabulary.

2. Description of the Related Art

Recently, voice recognition systems have become widely utilized in the field of computers. Particularly, considerably research and development has been made in the art of word processor systems with respect to carrying out an input operation by voice commands instead of key board operations. In such a word processor system, it is necessary to be able to recognize a word or words from among a large vocabulary, since in a voice recognition system, enormous quantities of information must be processed from a voice command input, especially, when a series of words is spoken, i.e., connected-speech. This is because many word templates must be processed to recognize the input words. As a result, the processing speed during voice recognition can not be improved and therefore, much actual time for displaying the recognition results is necessary for a display apparatus in the word processor systems.

SUMMARY OF THE INVENTION

The object of the present invention is to provide a voice recognition system having an improved pre-selector enabling high speed voice recognition by selecting valid word templates enabling recognition from among a plurality of word templates.

In accordance with the present invention, there is provided a voice recognition system selecting word templates necessary for voice recognition from among a plurality of word templates, including an input phoneme extraction unit for extracting distinctive phonemes which can be clearly recognized from an input pattern of the voice, and all phonemes possibly existing in the input pattern. A dictionary phoneme extraction unit is provided for extracting the distinctive phonemes which are clearly recognized and can be previously determined in each word template, and all phonemes possibly existing at each word template. A pre-selector is also provided for selecting valid word templates for performing voice recognition based on phoneme information extracted by the input phoneme extraction unit and the dictionary phoneme extraction unit.

BRIEF DESCRIPTION OF THE DRAWINGS

In the drawings:

FIG. 1 is a schematic block diagram of a conventional voice recognition system;

FIG. 2 is a view of a phonetic label network for explaining phonetic labels indicating consonants and vowels;

FIG. 3 is an essential part of a voice recognition system according to the present invention;

FIG. 5 is a diagram for explaining the bit assignment of each phoneme in one word;

FIG. 6 is a diagram for explaining bit expression values corresponding to the bit assignment shown in FIG. 5;

FIG. 14 is a diagram for explaining the data structure of the connection table memory shown in FIG. 11;

DESCRIPTION OF THE PREFERRED EMBODIMENTS

Figure 4:
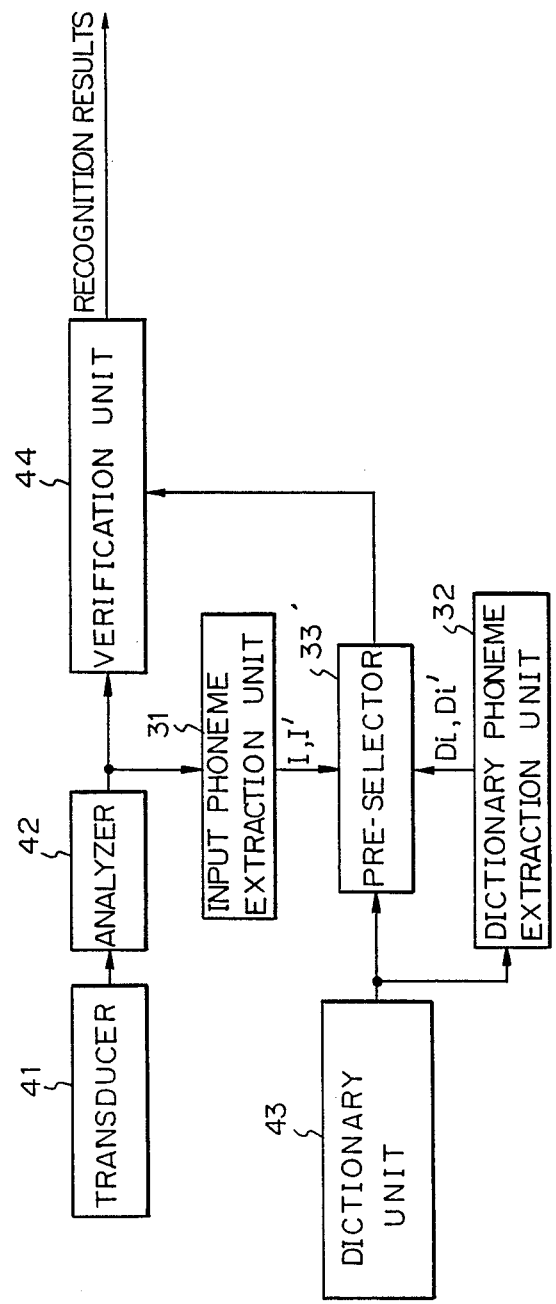
FIG. 4 is a schematic block diagram of a voice recognition system according to first and second embodiments of the present invention.

Before describing the preferred embodiments, an explanation will be given of a conventional voice recognition system.

In FIG. 1, reference number 11 represents a microphone, 12 an analyzer, 13 a dictionary unit, and 14 a verification unit. The input voice is converted to the electric signal by the microphone 11 and supplied to the analyzer 12.

The analyzer 12 analyzes the spectrum of an electric signal at a constant sampling period selected within a range of several milliseconds to several tens of milliseconds. In the above range, the electric signal has an approximately constant frequency characteristic. The analyzer 12 generates an input pattern consisting of a time series (a frame series) of the frequency spectrum for a short time. In this case, the spectrum analysis for a short time is performed by utilizing various conventional methods, for example, an analog filter bank, a digital filter bank, a fast Fourier transformer, and an LPC spectrum analyzer.

The dictionary unit 13 stores word templates consisting of words to be recognized. These words are used as references when recognizing the voice. Each of the word templates is expressed by a phonetic label network.

In FIG. 2, the phonetic label network is provided for expressing consonants and vowels forming the word. For example, the phonetic label network of the Japanese word "shi-ka-shi" (in English, this means "but") is expressed by the network shown in FIG. 2. In this network, "#" represents a word boundary, "SH" a consonant portion of a CV monosyllable shi, "I" a voiced vowel i, "i" a non-voiced (unvoiced) vowel i, "K" a consonant portion of the CV monosyllable ka, and "A" a vowel a. A non-voiced phenomena can be expressed in this phonetic label network since the vowel portion of the first and third syllables shi are non-voiced.

The verification unit 14 verifies the pattern input from the analyzer 12 with the word template read out from the dictionary unit 13, and outputs voice recognition results. That is, in the verification unit 14, a "similarity" (or "distance") between the input pattern and each word template is determined. The words selected from a larger similarity extent (in the case of distance, a smaller "distance") are output as the recognition data. In this case, a time warping between the input pattern and the word template is performed based on a "dynamic programming matching" method. The similarity between the input pattern and each phonetic label in the phonetic label network is calculated by referring to each phoneme template storing a spectrum pattern of the phonetic label.

A plurality of word templates are stored in the dictionary unit 13, to enable voice recognition.

As explained above, in the conventional voice recognition system, calculating similarity is performed by verifying the input pattern with all word templates stored in the dictionary unit 13. The above conventional method, however, is not suitable for voice recognition because of the large amount of information to be processed, which necessitates many word templates for recognizing the voice. Therefore, much actual time for displaying the recognition results is necessary for the display apparatus.

A voice recognition system according to the present invention will be explained in detail hereinafter.

In FIG. 3, reference number 31 represents an input phoneme extraction unit, 32 a dictionary phoneme extraction unit, and 33 a pre-selector.

The input phoneme extraction unit 31 is provided for extracting distinctive phonemes which can be clearly recognized from the input pattern of the voice and all phonemes which can exist in the input pattern.

The dictionary phoneme extraction unit 32 is provided for extracting distinctive phonemes which are clearly recognized at every word template and can be previously determined, and all phonemes which can exist at each word template.

The pre-selector 33 is provided for selecting the valid word templates for verifying voice recognition based on the phoneme information (I', I, $D_i'$, $D_i$) extracted by the input phoneme extraction unit 31 and the dictionary phoneme extraction unit 32.

The basic operation of this structure will be explained in detail hereinafter.

The input phoneme extraction unit 31 extracts the distinctive phonemes which can be clearly recognized from the input pattern of the voice to be recognized. In detail, when the similarity between the phoneme template previously provided and the input pattern at a certain timing (frame) exceeds the threshold value Th1, the phoneme corresponding to the phoneme template is extracted as being distinctive in the input pattern. Further, the input phoneme extraction unit 31 extracts all phonemes which can exist in the input pattern. When the similarity between the phoneme template previously provided and the input pattern at a certain timing (frame) exceeds the threshold value Th2, the phoneme corresponding to the phoneme template is extracted as a possibly existing phoneme in the input pattern. In this case, the threshold value Th2 is made considerably smaller than the threshold value Th1.

The dictionary phoneme extraction unit 32 extracts the distinctive phonemes which can be clearly recognized in each word template. All phonemes (nodes) constantly passing through any route in the phonetic label network of the word are extracted as distinctive phonemes in the word. Further, the dictionary phoneme extraction unit 32 extracts all phonemes which can exist in each word template. Namely, all phonemes (nodes) existing in the phonetic label network of the word are extracted as phonemes possibly existing in the words.

The pre-selector 33 selects the valid word templates for verifying voice recognition based on the phoneme information extracted from the input phoneme extraction unit 31 and the dictionary phoneme extraction unit 32. That is, the valid word templates are selected by using one of the selection criterion described below.

A first basic selection criterion includes that the word templates have the distinctive phonemes (I') in the input pattern extracted from the input phoneme extraction unit 31.

A second basic selection criterion includes that the distinctive phonemes ($D_i'$) in the word templates extracted by the dictionary phoneme extraction unit 32 are included in the possibly existing phonemes (I) in the input pattern extracted from the input phoneme extraction unit 31. A third basic selection criterion includes that the distinctive phonemes ($D_i'$) in the word templates extracted by the dictionary phoneme extraction unit 32 are included in the distinctive phonemes (I') extracted by the input phoneme extraction unit 31.

Further, a composite selection criterion (A) simultaneously satisfies the basic selection criterions 1 and 2.

A comparative selection criterion (B) simultaneously satisfies the basic selection criterions 1 and 3.

As explained above, since the valid word templates for verifying voice recognition can be selected from among a plurality of word templates, it is possible to considerably reduce the number of word templates which must be actually used as references.

The preferred embodiments are explained in detail with reference to FIGS. 4 to 20.

In FIG. 4, 41 denotes a transducer, for example, a microphone for converting an input voice to an electric signal. An analyzer 42 analyzes the spectrum of the electric signal at a constant sampling period selected from within the range of several milliseconds to several tens of milliseconds. The electric signals have an approximately constant frequency characteristic. The analyzer 42 generates an input pattern consisting of the time series (frame series) of the short time spectrum. A dictionary unit 42 stores the word templates which are used as references during voice recognition. Each word template is expressed by the phonetic label network of the word. A verification unit 44 outputs the voice recognition results verifying the pattern input from the analyzer 42 with the word templates selected by the pre-selector 33. The operation of this system are explained in detail hereinafter.

The analyzer 42 carries out a short time spectrum analysis of the electric signals input from the transducer 41, generates an input pattern based on the resultant data, and outputs this data to the input phoneme extraction unit 31 and the verification unit 44.

The input phoneme extraction unit 31 extracts the distinctive phonemes which can be clearly recognized from the input pattern of the voice and all phonemes possibly existing in the input pattern.

FIGS. 5 and 6 show the approximately twenty-four phonemes consisting of the vowels and the consonants (A, I, U ... P, Q) in the Japanese language as shown in FIG. 5. Therefore, each phoneme can be assigned to a corresponding bit in one word having thirty-two bits. Where, 0 to 31 denote the bit positions, and * marks denote not-assigned bit positions. When the distinctive phonemes, for example, "A", "O" and "S", are extracted from the input phoneme extraction unit 31, the bit positions "0", "4" and "6" become "1" as shown in FIG. 6. The phoneme expressed by each bit is called the "bit expression value" hereinafter. Such a bit expression value is also used for the phoneme extracted from the dictionary phoneme extraction unit 32, and a high speed logic calculation is possible by utilizing the above bit expression value in a logic operation circuit. For example, the calculation is very effective for the logic operation in the pre-selector because the word selected must be quickly deleted in the pre-selector.

The operation of the input phoneme extraction unit 31 is explained in detail with reference to FIGS. 7 to 10.

Figure 7:
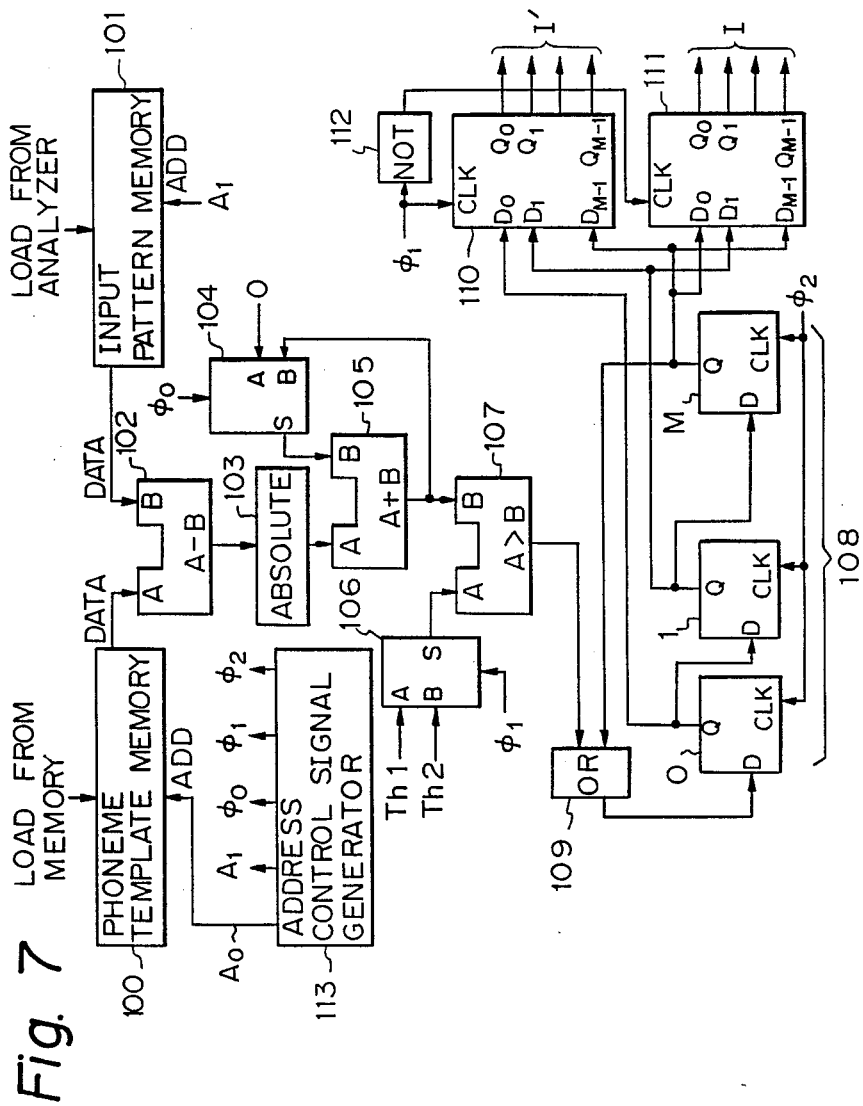
FIG. 7 is a detailed block diagram of the input phoneme extraction unit shown in FIGS. 3 and 4.

In FIG. 7, the phoneme templates stored in a supplementary memory (for example, a disk system, not shown) at every speaker are input to the phoneme template memory 100 when the system is reset.

Figure 9:
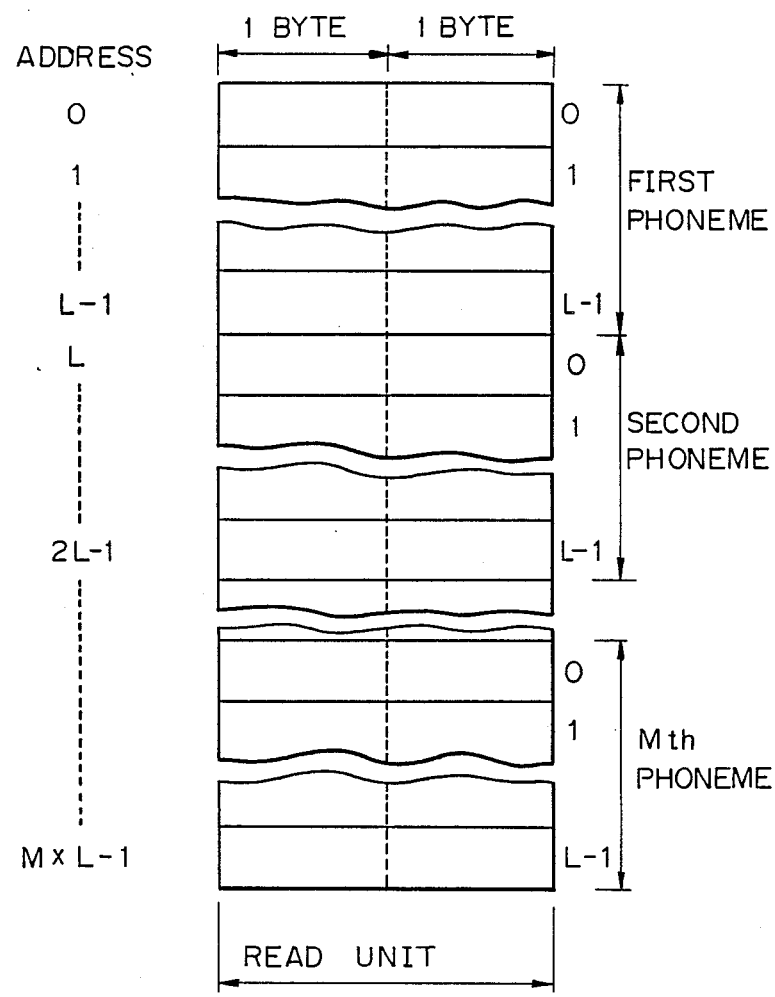
FIG. 9 is a diagram for explaining the contents of the phoneme template memory shown in FIG. 7.
Figure 10:
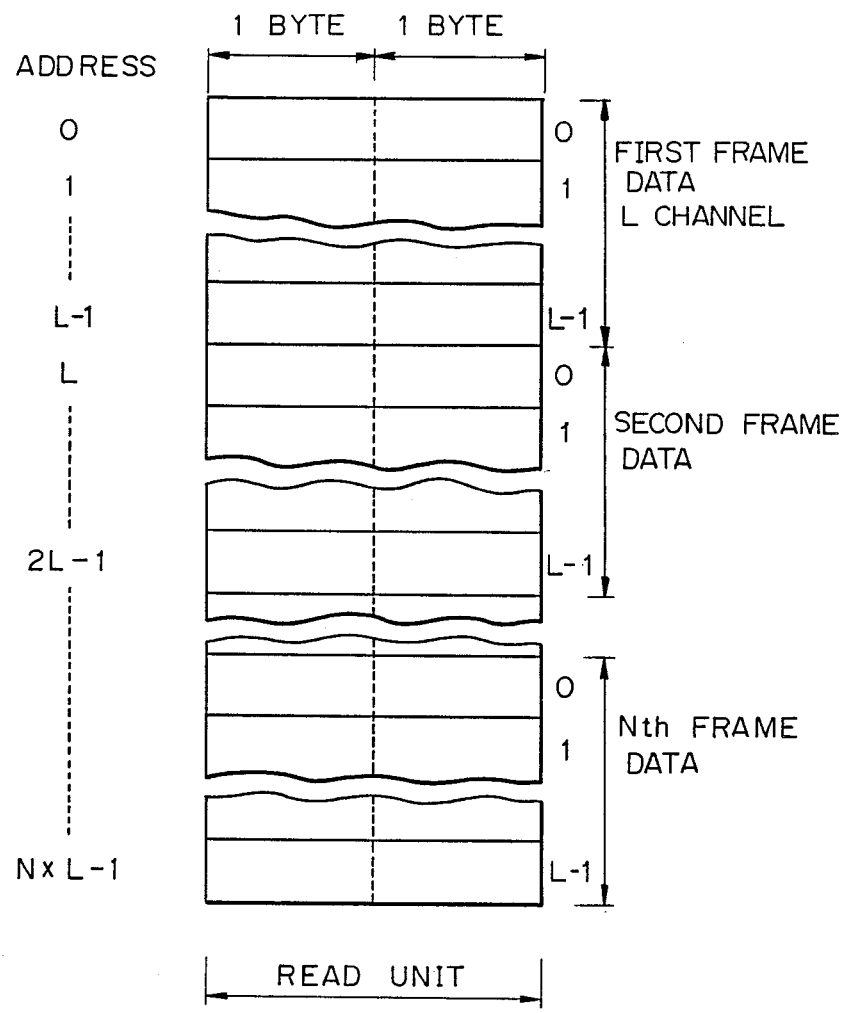
FIG. 10 is a diagram for explaining the contents of the input pattern memory shown in FIG. 7.

The contents of the phoneme template memory 100 are explained with reference to FIG. 9. A read unit in the memory 100 is given by; two-bytes (1+1 byte). Addresses for a read/write operation are assigned from "0" to "M*L-1". "M" denotes the number of the phoneme templates, and "L" denotes the number of channels (dimension) in each phoneme template. Each channel is expressed by two-bytes. The address of the memory 100 is controlled by the signal $A_0$ generated by the address control signal generator 113.

The input pattern analyzed by the analyzer 42 is input to the input pattern memory 101. The contents of the input pattern memory 101 are explained with reference to FIG. 10. The read unit of the memory 101 is also given by two-bytes. The addresses for a read/write operation are assigned from "0" to "N*L-1". "N" denotes a maximum number of frames of the input voice, and "L" denotes the number of channels (dimension). Each channel is expressed by two-bytes. The address of the memory 101 is controlled by the signal $A_1$ generated by the address control generator 113.

The subtracter 102 is provided for calculating the differences between the parameter at a certain channel in the phoneme template and the parameter at a certain channel corresponding to the frame in the input pattern. The absolute value circuit 103 is provided for calculating the absolute value of (A-B) output from the subtracter 102. The selector 104 and the adder 105 form an accumulator. The adder 105 calculates the Chebyshev norm (sum of the absolute values of the difference between elements) between the phoneme template and the frames in the input pattern by accumulating the outputs of the absolute value circuit 103. The selector 104 resets the accumulation value to "0" when the signal $\phi_0$ input from the generator 113 is "1". The comparator 107 compares the Chebyshev norm between the phoneme template and the frame in this input pattern calculated by the adder 105 with the threshold values (Th1 or Th2) selected by the selection 106, and outputs "1" when the Chebyshev norm is smaller than the threshold value. The selector 106 is controlled by the signal $\phi_1$ generated by the generator 113. When the signal $\phi_1$ is "0", the threshold Th1 is output to the comparator 107, and when the signal $\phi_1$ is "1", the threshold Th2 is output to the comparator 107. In this case, the threshold value Th2 is set to a considerably larger value than that of Th1. When the signal $\phi_1$ is "0", the threshold value for the Chebyshev norm is small. When the relationship between the phoneme template and the input frame is very close, the output of the comparator 107 becomes "1", and when the signal $\phi_1$ is "1", the threshold value for the Chebyshev norm is large. Even if the relationship is far apart, the output of the comparator 107 also becomes "1".

The shift register 108 is formed by a plurality of latch circuits 0 to M. The numbers of the latch circuits correspond to the numbers (M) of the phoneme templates. The shift timing of this circuit is controlled by the signal $\phi_2$ generated by the generator 113. The signal $\phi_2$ becomes "1" when each phoneme template is read out from the phoneme template memory 100.

The OR circuit 109 outputs the data input from the comparator 107 to the shift register 108. As a result, the shift register 108 stores the bit patterns of the phoneme which can be clearly recognized when the signal $\phi_1$ is "0", and stores the bit patterns of all phonemes possibly existing in the input pattern when the signal $\phi_1$ is "1".

The register 110 holds the contents of the shift register 108 for the instant when the signal $\phi_1$ changes from "0" to "1". The contents correspond to the bit patterns I' of the phonemes which can be clearly recognized. The register 111 holds the contents of the shift register 108 for the instant when the signal $\phi_1$ changes from "1" to "0". This corresponds to the bit patterns I of the phonemes possibly existing in the input pattern.

The NOT circuit 112 calculates the inverse of the signal $\phi_1$ to generate a hold timing for the register 111. The bit patterns I and I' held in the registers 110 and 111 are read out to the pre-selector 33.

The address control signal generator 113 is formed by, for example, a microprocessor, and generates the address signal $A_0$ for the memory 100, the address signal $A_1$ for the memory 101, the reset timing signal $\phi_0$ for the accumulator (104 and 105), the timing signal $\phi_1$ for switching the threshold value, and the shift timing signal $\phi_2$ for the shift register 108.

Figure 8A:
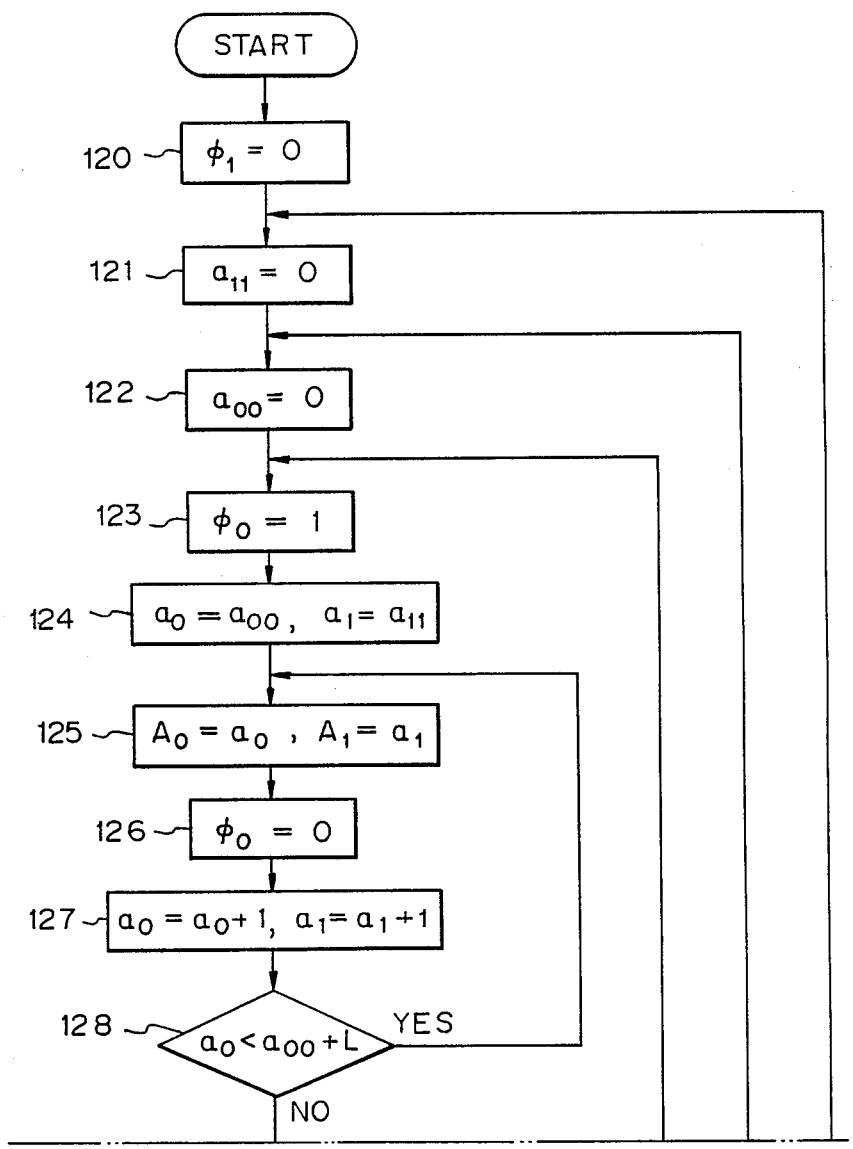
FIGS. 8A and 8B are flowcharts for explaining the operation of signal generation at the address control signal generator shown in FIG. 7.
Figure 8B:
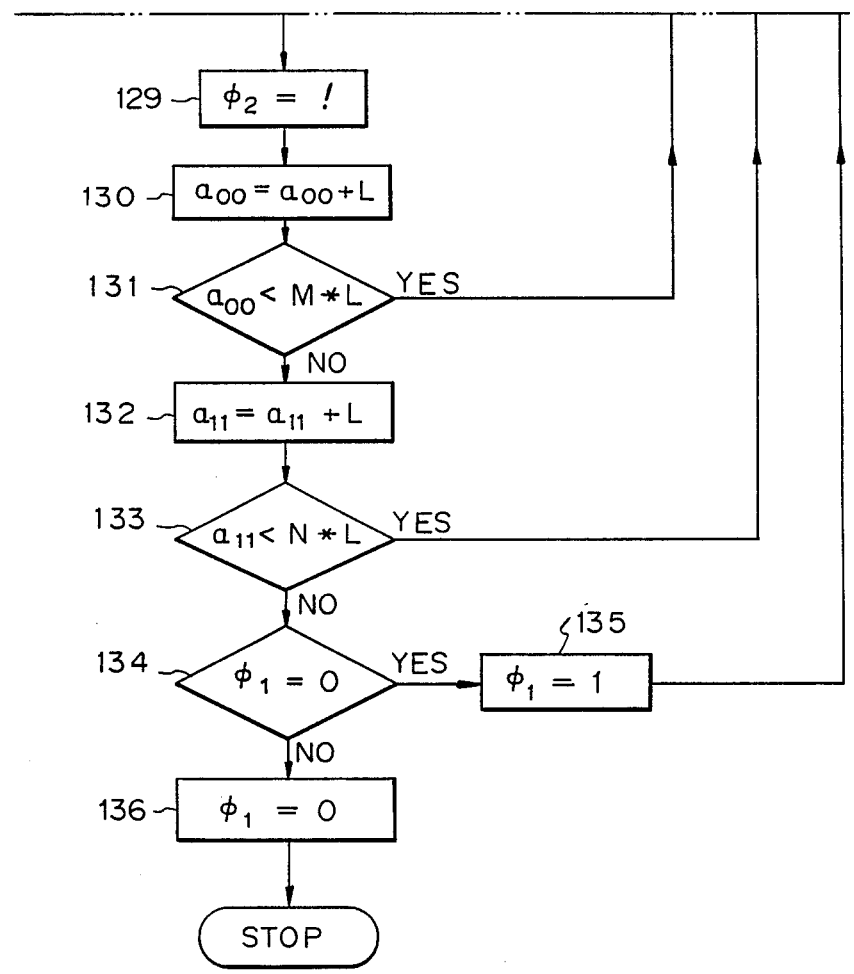

In FIGS. 8A and 8B, the procedure for generating the signals $A_0$, $A_1$, $\phi_0$, $\phi_1$, and $\phi_2$ from the generator 113 is explained in detail.

In step 120, when the signal $\phi_1$ is reset to "0", the threshold value Th1 is selected in the selector 106, and the calculation of the bit patterns I'0 is started.

In step 121, the internal parameter $a_{11}$ is set to "0". The parameter a11 holds the head address of the frame of the input pattern memory 101 at each timing.

In step 122, the internal parameter $a_{00}$ is set to "0". This parameter $a_{00}$ holds the head address of each template in the phoneme template memory 100 at each timing.

In step 123, when the signal $\phi_0$ becomes "1", the accumulator for the calculation of Chebyshev's norm is initialized.

In step 124, the parameter $a_{00}$ replaces the parameter $a_0$, and the parameter $a_{11}$ replaces the parameter $a_1$. The internal parameter $a_0$ holds the address of the channel to be designated in the phoneme template which is also to be designated. The internal parameter $a_1$ holds the address of the channel to be designated in the frame which is also to be designated in the input pattern memory 101.

In step 125, the calculated parameters $a_0$ and $a_1$ are output to the signals $A_0$ and $A_1$.

In step 126, when the signal $\phi_0$ becomes "0", then the accumulator for the calculation of Chebyshev's norm is started.

In step 127, "1" is added to the parameter $a_0$ and $a_1$, and channel of the phoneme template and the frame in the input pattern go to the next stage.

In step 128, it is determined whether or not channels of the phoneme templates to be calculated remain. When YES, the procedure returns to step 125. When NO, the procedure goes to step 129.

In step 129, the pulse signal is output to the signal $\phi_2$, and the bit pattern of one bit in the shift register 108 is shifted to the next latch circuit. The outputs of the comparator 107 and the latch circuit M are input to the OR circuit 109, and the output of the OR circuit 109 is input to the latch circuit 0 in the shift register 108. That is, a loop is formed by the shift register 108 and the OR circuit 109.

In step 130, "L" is added to the parameter $a_{00}$, and the head address of the next phoneme template is calculated.

In step 131, it is determined whether or not phoneme templates to be calculated remain. When YES, the procedure returns to step 123. When NO, the procedure goes to step 132.

In step 132, "L" is added to the parameter $a_{11}$, and the head address of the next frame in the input pattern is calculated.

In step 133, it is determined whether or not frames in the input pattern to be calculated remain. When YES, the procedure returns to step 122. When NO, the procedure goes to step 134.

In step 134, when the signal $\phi_1$ is "0", the procedure goes to step 135.

In step 135, the signal $\phi_1$ is set to "1", and the procedure returns to step 121.

In step 136, the signal $\phi_1$ is set to "0", and the routine is stopped.

The operation of the dictionary phoneme extraction unit 32 is explained in detail with reference to FIGS. 11 to 15.

Figure 11:
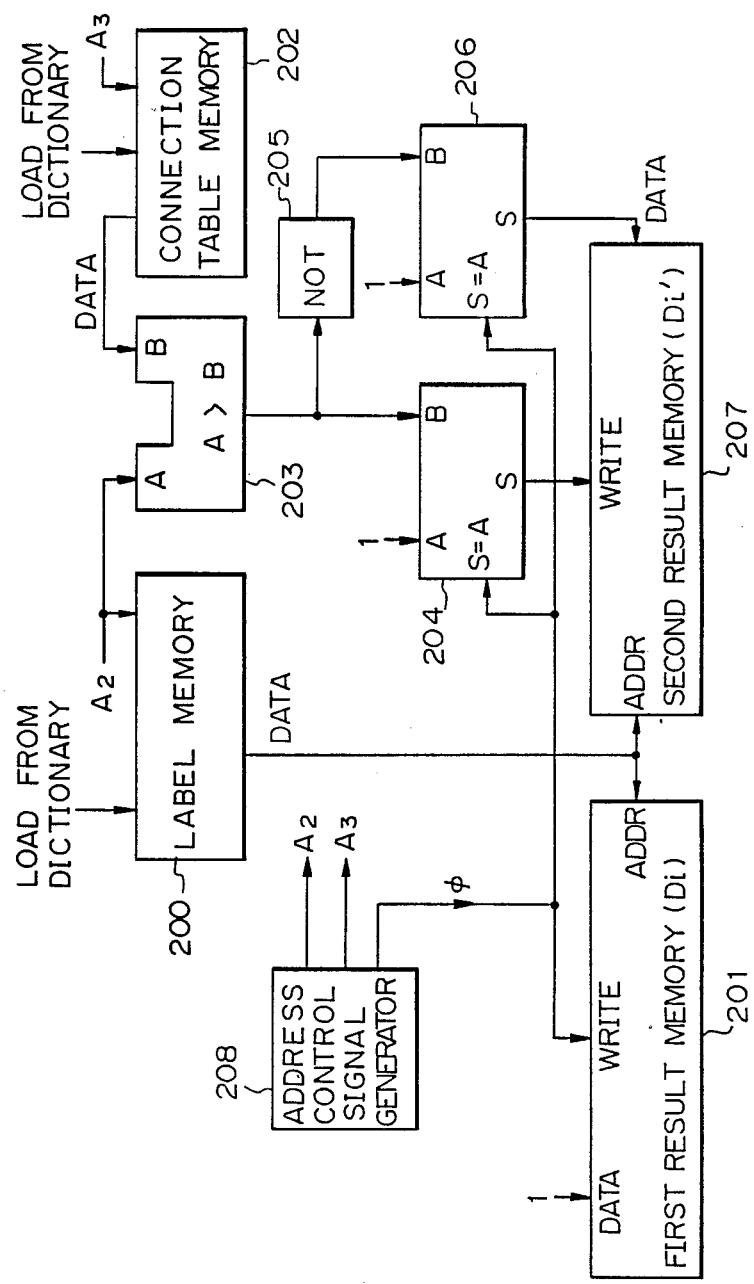
FIG. 11 is a detailed block diagram of the dictionary phoneme extraction unit shown in FIGS. 3 and 4.
Figure 13:
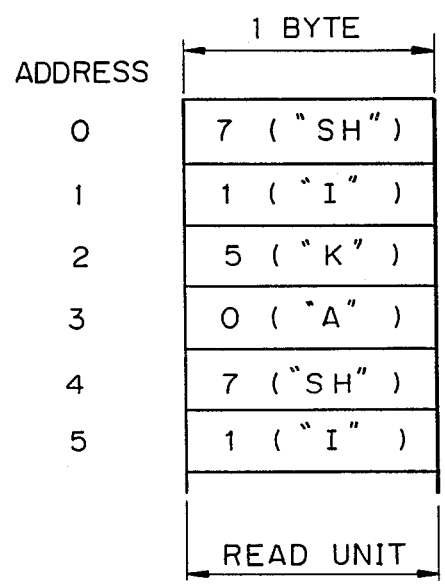
FIG. 13 is a diagram for explaining the contents of the label memory shown in FIG. 11.
Figure 15:
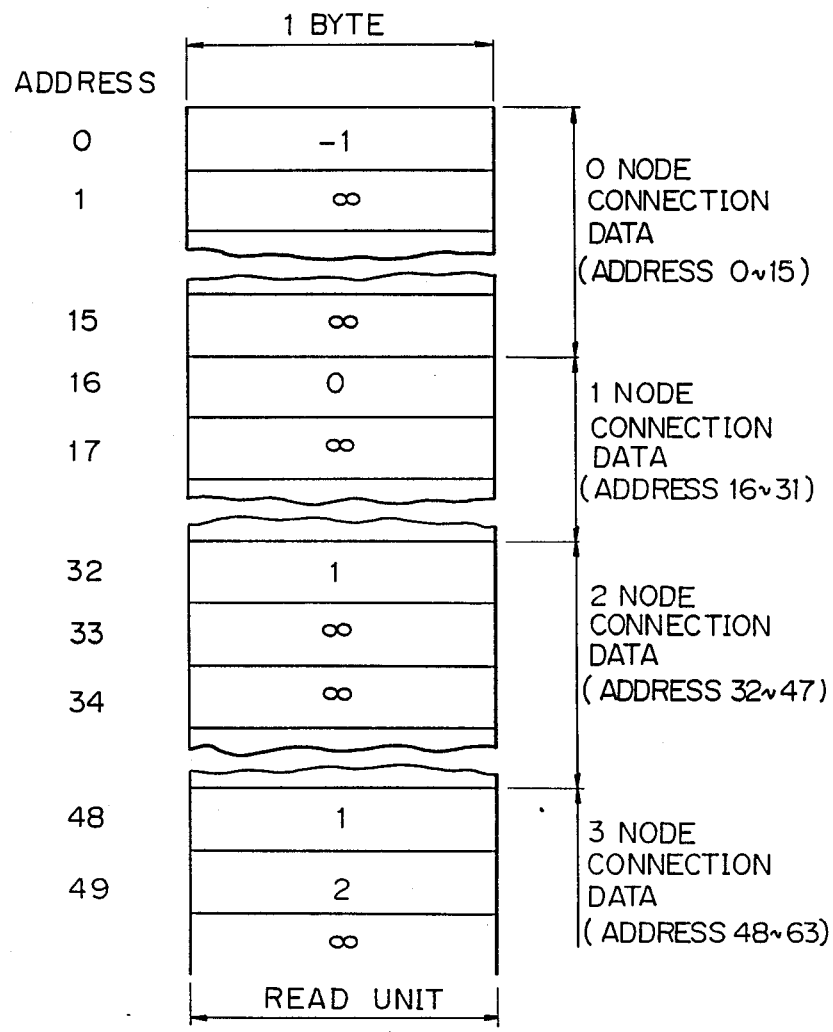
FIG. 15 is a diagram for explaining the contents of the connection table memory shown in FIG. 11.

In FIG. 11, the label memory 200 stores the phonetic labels (expressed by numerical values) of the phonetic label network in the word dictionary. The contents of the label memory are shown in FIG. 13. The phonetic labels of the phonetic label network shown in FIG. 2 are stored in the label memory 200. The read unit of the label memory 200 is one byte. The value expressed by the numeral (bit position) of the phonetic label of each node in the network is stored in the memory 200 from the first bit of every one byte. As is obvious from FIG. 5, "SH" corresponds to the bit position 7, "I" to the bit position 1, "K" to the bit position 5, and "A" to the bit position 0. The address of the memory 200 is controlled by the signal $A_2$ generated by the address control signal generator 208.

The first result memory 201 is accessed by 1 bit as the read unit. The address of the memory 201 corresponds to the numerical value of the phonetic label. The data sequentially read out from the memory 200 is supplied to the address (ADDR) in the result memory 201. The data supplied to the memory 201 is always "1", and the control signal $\phi$ is always supplied as the write signal. When the control signal $\phi$ is "1", the data "1" is written to the address of the result memory 201 corresponding to the data stored in the label memory 200. That is, bit expression values of all phonemes existing in the dictionary are formed in the result memory 201.

The node connection information of the phonetic label network is supplied from the dictionary unit to the connection table memory 202. The node connection information is shown in FIG. 14, and stored to the connection table memory 202 in the form shown in FIG. 15.

In FIG. 14, when the numbers of the node of the network are "NN" (the "#" at both ends do not count as the node) and the numbers of the connectable nodes are "MM", the node connection information is given by the matrix (NN+1) * MM. In this embodiment, "NN" are given as six nodes, and "NN" are changed according to the word dictionary. Further, "MM" are given as DEPTH 16. Each column of the matrix corresponds to each node, and the numerals of each row of the matrix express the column (node) number to be connected. In this case, each node number to be connected is always set so as to become smaller than its own node number. For example, in the 2 NODE, the node number of the first row is "1", and the second row is "0". When the node is not connected, the mark "∞" is expressed. That is, the mark "∞" indicates the maximum positive integer (127) based on the 2's complement of 8 bits. The connection to the head node "#" is given by "−1". The node connection information explained above is stored in the memory 202 in the form shown in FIG. 15. The address of the memory 202 is controlled by the signal $A_3$ generated by the generator 208.

The comparator 203 compares the address $A_2$ of the label memory 200 and the connection node number from the memory 202, and outputs the data "1" when the latter is smaller than the former. The output "1" from the comparator 203 means that there is a connection from the rear node to the front node.

The selector 204 transfers the output of the comparator 203 to the second result memory 207 as the write data when the signal $\phi$ is "0".

The NOT circuit 205 calculates the negation of the output of the comparator 203.

The selector 204 transfers the negation of the output of the comparator 203 to the memory 207 as the write signal. When the signal $\phi$ is "0", only "0" is written into the memory 207 based on the logic loop consisting of the circuits 204, 205, and 206. When the signal $\phi$ is "1", the same contents of the memory 201 are written to the memory 207.

In the memory 207, when the signal $\phi$ is "1", the bit expression values of all phonemes existing in the network are formed. When the signal $\phi$ is "0", the bits corresponding to the phonemes, which do not always exist, is reset, and as a result, the bit expression value of the phonemes which always exist are formed.

The address control signal generator 208 generates the address $A_2$ of the label memory 200, the address $A_3$ of the connection table memory 202, and the control signal $\phi$. The generator 208 is formed by a microcomputer.

Figure 12:
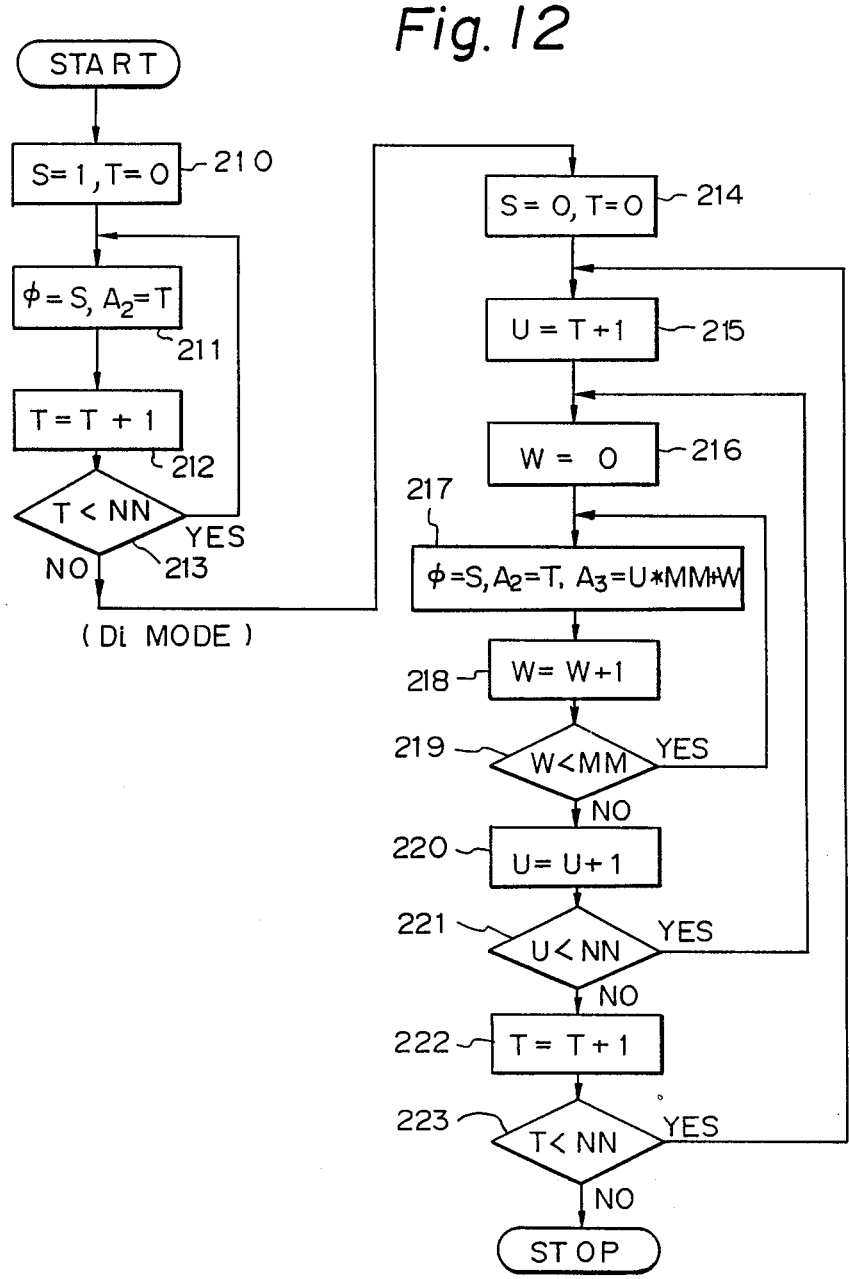
FIG. 12 is a flowchart for explaining the operation of the address control signal generator shown in FIG. 11.

The operation in the address control signal generator 208 is explained in detail with reference to FIG. 12.

In step 210, the data "1" is set to the internal parameter S and "0" is set to the internal parameter T. The parameter S expresses either the extraction mode $D_i$ or $D_i'$. When the parameter S is "1", the mode is "$D_i$". When the parameter S is "0", the mode is "$D_i'$". The parameter T indicates the address of the phoneme in the label memory.

In step 211, the parameter S is output to the signal $\phi$, and the parameter T is output to the signal $A_2$. The numerical expression of the phonetic label of the address T in the label memory 200 is output as the address of the first result memory 201 and the second result memory 207, and the bits at that address are set.

In step 212, the data "1" is added to the parameter T, and the next address in the label memory 200 is generated.

In step 213, it is determined whether or not the labels of the network now loaded in the label memory 200 remain. When the labels remain, the procedure returns to step 211. When the labels do not remain, the procedure goes to step 214.

In step 214, the data "0" is set to the internal parameters S and T.

In step 215, the data "T+1" is replaced by the internal parameter U. The parameter U designates the next node from the present node.

In step 216, the data "0" replaces the internal parameter W. The parameter W indicates the row of the connection table shown in FIG. 14. "W=0" means the first row.

In step 217, the parameter S is output to the signal $\phi$, the parameter T is output to the address $A_2$, and the data "U*MM+W" is output to the address $A_3$. The address $A_3$ is used for designating all elements existing at nodes following the present node in the connection table.

In step 218, the data "1" is added to the parameter W, and the row is moved to the next stage in the connection table.

In step 219, the row position is examined. When the parameter W exceeds the depth "MM", the procedure goes to step 220.

In step 220, the data "1" is added to the parameter U, and the node position in the connection table is moved to the next stage.

In step 221, the column position is examined. When the parameter U exceeds the node "NN", the procedure goes to step 222.

In step 222, the present node position (column position) is moved to the next node position.

In step 223, the column position is examined. When the parameter T exceeds the node "NN", the procedure is stopped.

Consequently, the extraction mode $D_i$ is stored in the first result memory 201, and the extraction mode $D_i'$ is stored in the second result memory 207.

Figure 16:
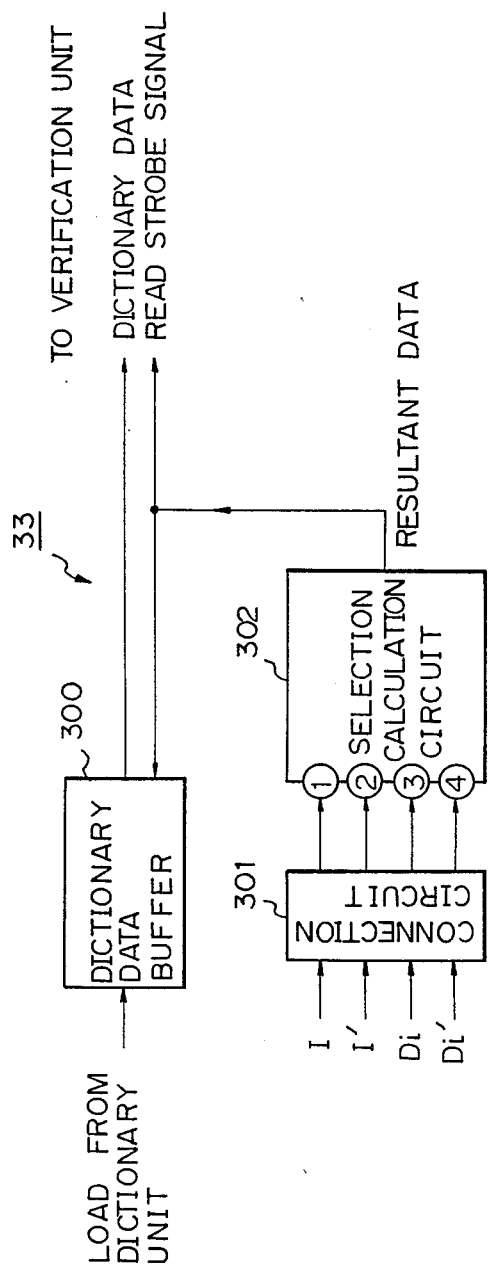
FIG. 16 is a block diagram of the pre-selector shown in FIGS. 3 and 4.
Figure 18:
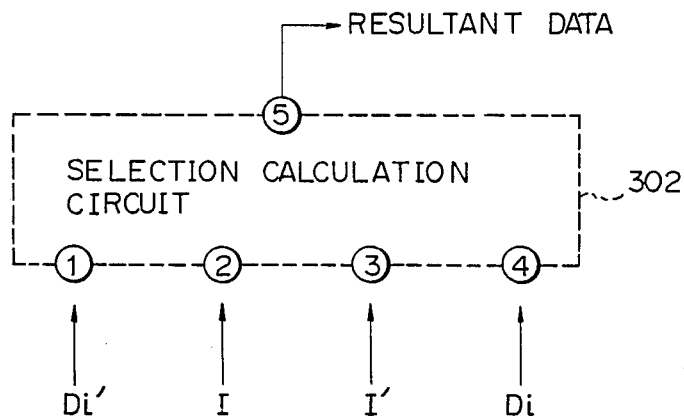
FIGS. 18 and 19 are diagrams for explaining the connection of the bit expression values at the connection circuit shown in FIG. 16.
Figure 19:
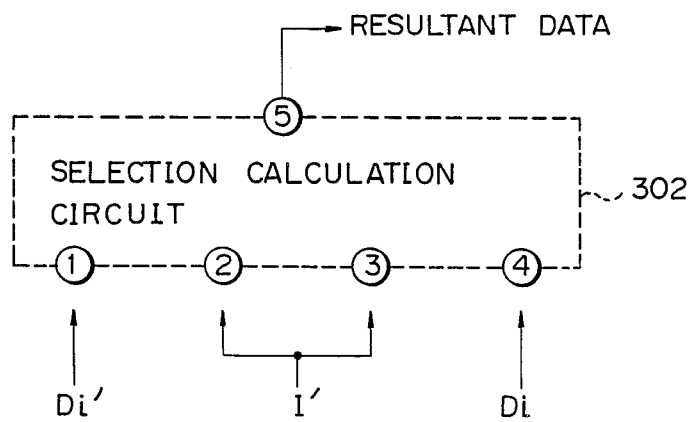

In FIG. 16, the pre-selector 33 comprises a dictionary data buffer 300, a connection circuit 301, and a selection calculation circuit 302. A detailed diagram of the connection circuit 301 is shown in FIGS. 18 and 19, and a detailed diagram of the selection calculation circuit 302 is shown in FIG. 17.

The operations of these circuits are explained in detail with reference to FIGS. 16 to 19.

Figure 17:
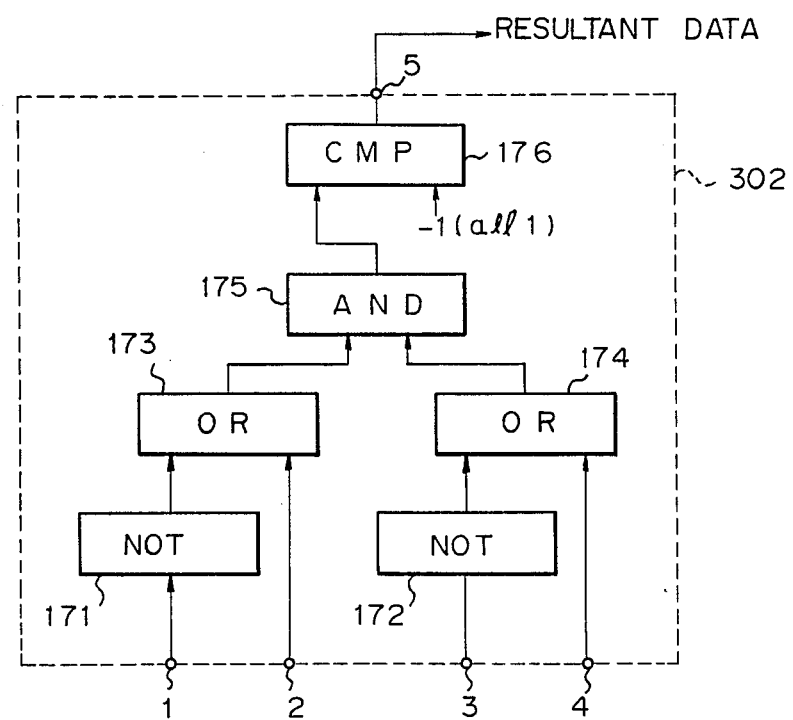
FIG. 17 is a block diagram of the selection calculation circuit shown in FIG. 16.

The selection calculation circuit 302 is formed by NOT circuits 171 and 172, OR circuits 173 and 174, an AND circuit 175, and a comparator (CMP) 176 as shown in FIG. 17.

In the first embodiment, the composite selection criterion A is selected. This criterion A is defined by the basic selection criterions 1 and 2 as explained above.

First, the word templates which satisfy the basic selection criterion 1 are selected. That is, the selection criterion between the bit expression value $D_i$ of all phonemes forming each word template and the bit expression value (I') of the distinctive phonemes of the input pattern is given by the following formula.

$$D_i \cdot I' = I' \tag{1}$$

Second, the word templates which satisfy the basic selection criterion 2 are selected. That is, the selection criterion between the bit expression value $D_i'$ of the distinctive phonemes in the word template and the bit expression value I of the phonemes possibly existing in the input pattern, is given by the following formula.

$$D_i' \cdot I = D_i' \tag{2}$$

The word templates which simultaneously satisfy the formulae (1) and (2) are the distinctive word templates to be used for verifying the voice recognition.

When all bits given by the following formula (3) are "1", the above criterion are satisfied.

$$(D_i \cdot I') \oplus I' \cdot (D_i' \cdot I) \oplus D_i' \tag{3}$$

Where, "$\oplus$" denotes an exclusive OR at every bit, and "—" denotes an all bit inversion.

The formula (3) is simplified as follows.

$$(D_i + I') \cdot (D_i' + I) \tag{4}$$

Where "+" denotes an OR at every bit.

In FIGS. 17 to 19, the bit expression values $D_i'$ are input to the NOT circuit 171, the bit expression values I are input to the OR circuit 173, the bit expression values I' are input to the NOT circuit 172, and the bit expression values $D_i$ are input to the OR circuit 174. Further, the output of the AND circuit 175 and the data "—1" are input to the comparator 176.

The OR circuit 173 calculates the formula $(D_i' + I)$, and the OR circuit 174 calculates the formula $(D_i + I')$. These date are input to the AND circuit 175. The formula (4) is calculated in the AND circuit 175, and the resultant data is input to the comparator 176. The comparator 176 compares the formula (4) with the data "—1", and it is determined whether or not all bits of the formula (4) are "1".

In FIG. 16, the dictionary data buffer 300 temporarily stores the word template read out from the dictionary unit 43. The bit expression values I and I' are input from the input phoneme extraction unit 31 to the connection circuit 301, and the bit expression values $D_i$ and $D_i'$ are input from the dictionary phoneme extraction unit 32 to the connection circuit 301. The connection circuit is provided for switching the bit information values I and I' in the terminals 2 and 3.

When the resultant data at the selection calculation circuit 302 is "1", the dictionary data indicating the word template is sent to the verification unit 44, and this dictionary data is utilized for the actual voice recognition. The read strobe signal is provided for determining the output timing of the dictionary data.

In the verification unit 44, the similarity of each word template is determined based on the input pattern from the analyzer 42 and the dictionary data from the pre-selector 33. One or more word names in the word templates having the greatest similarity are output sequentially as the recognition data.

In the second embodiment, the composite selection condition B is selected. This criterion B is defined by the basic selection criterion 1 and 3 as explained above.

First, the word templates which satisfy the basic selection criterion 1 are selected. This step is the same step as in the first embodiment. That is, the selection criterion between the bit expression values $D_i$ of all phonemes forming each word template and the bit expression values $I'$ of the distinctive phonemes of the input pattern is given by the following formula.

$$D_i \cdot I' = I' \tag{5}$$

The formula (5) is the same as the formula (1).

Second, the word template which satisfies the basic selection criterion 3 is selected. That is, the selection criterion between the bit expression values $D_i'$ of the distinctive phonemes of the word template and the bit expression values $I'$ of the distinctive phonemes of the input pattern is given by the following formula.

$$D_i' \cdot I' = D_i' \tag{6}$$

The word templates which simultaneously satisfy the formulae (5) and (6) are the distinctive word templates for performing the voice recognition.

When all bits given by the following formula (7) are "1", the above criterion is satisfied.

$$(D_i \cdot I') \oplus I' \cdot (D_i' \cdot I') \oplus D_i' \tag{7}$$

The formula (7) is simplified as follows.

$$(D_i + I') \cdot (D_i' + I') \tag{8}$$

The formula (8) can be realized by the connection of the bit expression values $I'$ shown in FIG. 19.

In FIG. 17, the bit expression values $D_i'$ are input to the NOT circuit 171, the bit expression values $I'$ are input to the NOT circuit 172 and the OR circuit 173, and the bit expression values $D_i$ are input to the OR circuit 174. The output of the AND circuit 175 and the data "−1" are input to the comparator 176.

The OR circuit 173 calculates the formula $(D_i' + I')$, and the OR circuit 174 calculates the formula $(D_i + I')$.

This data is input to the AND circuit 175. The AND circuit 175 calculates the formula (8), and outputs to the comparator 176. The comparator 176 compares the formula (8) with the data "−1", and determines whether all bits of the formula (8) are "1".

As explained in the first embodiment, the bit expression values $D_i$ of all phonemes existing in each word template generated by the dictionary phoneme extraction unit 32. The bit expression values $D_i'$ of the distinctive phonemes at each word template are determined by the distinction of each word template regardless of the input pattern. Therefore, when these bit expression values $D_i$ and $D_i'$ at each word template are previously determined, it is possible to reduce the number of words to be selected and to raise the throughput efficiency.

Figure 20:
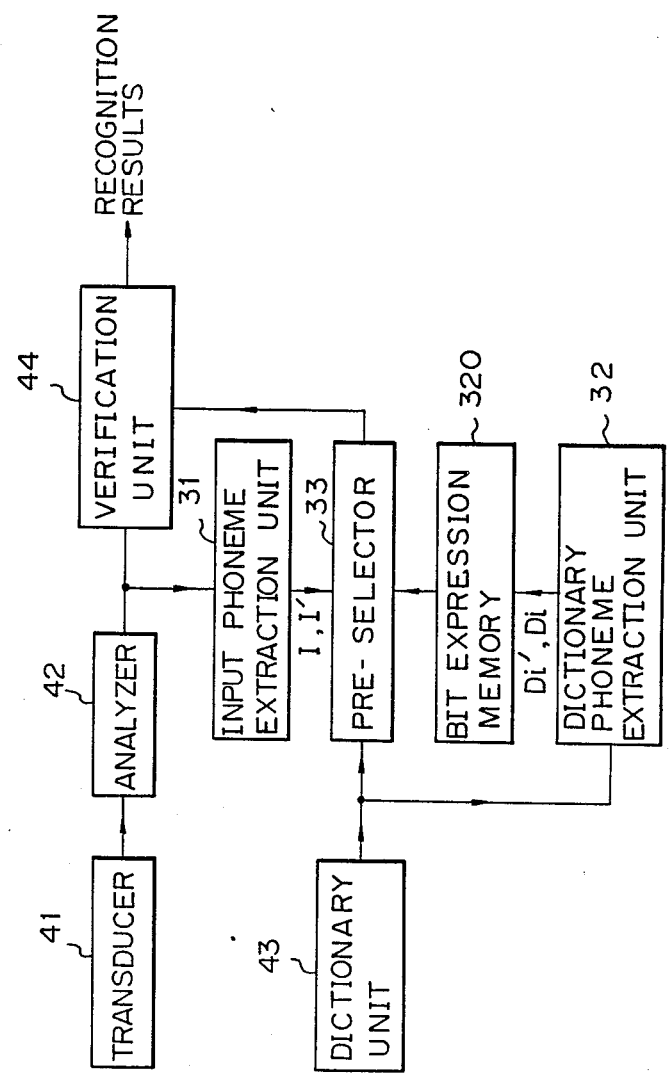
FIG. 20 is a block diagram of a voice recognition system according to a third embodiment of the present invention.

The third embodiment is explained with reference to FIG. 20. In FIG. 20, the bit expression memory 320 is provided between the dictionary phoneme extraction unit 32 and the pre-selector 33. The other units are the same as those of FIG. 4. The bit expression memory 320 stores the bit expression values $D_i$ and $D_i'$ previously generated by the dictionary phoneme extraction unit 32.

The bit expression values $D_i$ and $D_i'$ are related to all word templates existing in the verification unit 44.

In the pre-selector 33, when the bit expression values I and $I'$ are input from the unit 31, the word templates satisfying any of the formulae (3), (4), (7), or (8) can be selected based on the bit expression value $D_i$ and $D_i'$ in the memory 320. Accordingly, it is possible to raise through-put efficiency higher than in the first and second embodiments.

The present invention is not limited by these embodiments. For example, other bit numbers can be used as the bit numbers for one word. Further, the present invention can be applied to languages other than Japanese.

The advantages of the present invention are briefly explained as follows.

(a) Since the valid word templates for verifying the voice recognition can be selected from a plurality of word templates, it is possible to considerably reduce the number of word templates actually used as a reference.

(b) Since the valid word templates can be quickly selected, it is possible to considerably reduce the quantities of information to be processed for voice recognition without reduction in the recognition efficiency.

(c) It is possible to considerably shorten the actual recognition time for voice recognition. In this case, the actual recognition time means the time from the input of the voice to moment of display on the CRT.

We claim:

1. A voice recognition system for selecting word templates necessary for voice recognition from among a plurality of word templates, comprising:

an input phoneme extraction unit for extracting distinctive phonemes which can be clearly recognized from an input pattern of a voice and for extracting all phonemes possibly existing in the input pattern, said input phoneme extraction unit generates first bit expression values of the distinctive phonemes which can be clearly recognized from the input pattern, and generates second bit expression values of all phonemes possibly existing in the input pattern;

a dictionary phoneme extraction unit for extracting the distinctive phonemes which are clearly recognized and can be previously determined at each word template and for extracting all phonemes possibly existing at each word template, said dictionary phoneme extraction unit generates third bit expression values of the distinctive phonemes which can be clearly recognized and can be previously determined at each word template, and generates fourth bit expression values of all phonemes possibly existing in each word template;

a pre-selector, coupled between said input phoneme extracting unit and said dictionary phoneme extracting unit, for selecting valid word templates for performing voice recognition based on phoneme information extracted by said input phoneme extraction unit and said dictionary phoneme extraction unit, said preselector selects valid word templates by employing the following formula:

$$(D_i \cdot I') \oplus I' \cdot (D_i \cdot I) \oplus D_i'$$

wherein $D_i$ is the fourth bit expression value, $D_i'$ is the third bit expression value, I is the second bit expression value, $I'$ is the first bit expression value, i is the number of the word template, and $\oplus$ denotes an exclusive OR operation, said preselector also determining whether or not all bits of the above formula indicate the value "1"; and a bit expression memory, coupled between said dictionary phoneme extraction unit and said pre-selector, for storing the third and fourth bit expression values previously calculated by said dictionary phoneme extraction unit.

2. A voice recognition system as claimed in claim 1, wherein said pre-selector comprises:

dictionary data buffer means for receiving phonemes from said dictionary phoneme extraction unit and for temporarily storing the phonemes;

connection circuit means for receiving the first through fourth bit expression values; and selection calculation circuit means, connected between said dictionary data buffer means and said connection circuit, for receiving outputs from said connection circuit means and outputting resultant data to said dictionary data buffer means.

3. A voice recognition system as claimed in claim 2, wherein said selection calculation circuit means comprises:

first and second NOT circuits, operatively connected to receive said second and fourth bit expression values, respectively, and outputting respective signals;

first and second OR circuits, operatively connected to said first and second NOT circuits, and operatively connected to receive said first and third bit expression values, respectively, and said outputs from said first and second NOT circuits, respectively, for outputting respective signals;

an AND circuit, operatively connected to said first and second OR circuits, for receiving the output signals from said first and second OR circuits and outputting a signal; and comparator means, operatively connected to said AND circuits and operatively connected to receive a "−1" data, for determining whether all bits output from said AND circuit are "1".

* * * * *

UNITED STATES PATENT AND TRADEMARK OFFICE
CERTIFICATE OF CORRECTION

PATENT NO. : 4,962,535
DATED : OCTOBER 9, 1990
INVENTOR(S) : SHINTA KIMURA ET AL.

It is certified that error appears in the above-identified patent and that said Letters Patent is hereby corrected as shown below:

Col. 6, line 55, "I'O" should be --I'--;
line 57, "all" should be --$a_{11}$--.

Col. 7, line 11, "and channel" should be --the channel--.

Col. 9, line 30, "$A_3$ The" should be --$A_3$. The--.

Col. 10, line 41, "$(D_i'+I)$" should be --$(\overline{D_i'}+I)$--;

line 42, "$(D_i+I')$" should be --$(D_i+\overline{I'})$--.

Col. 11, Equation (8), "$(D_i+I') \cdot (D_i'+I')$" should be
--$(D_i+\overline{I'}) \cdot (\overline{D_i'}+I')$--;

line 44, "$(D_i'+I')$" should be --$(\overline{D_i'}+I')$--;

line 45, "$(D_i+I')$" should be --$(D_i+\overline{I'})$--;

line 47, "outputs" should be --outputs the result--.

Signed and Sealed this

Eighteenth Day of February, 1992

*Attest:*

HARRY F. MANBECK, JR.

*Attesting Officer*      *Commissioner of Patents and Trademarks*